Patented May 16, 1944

2,349,222

UNITED STATES PATENT OFFICE 2,349,222

MANUFACTURE OF AMINES

Roland H. Goshorn, Trenton, Mich., assignor to Sharples Chemicals Inc., Philadelphia, Pa., a corporation of Delaware No Drawing. Original application September 26, 1940, Serial No. 358,426. Divided and this application April 2, 1942, Serial No. 437,355

4 Claims. (Cl. 260—585)

The present invention pertains to the manufacture of amines. This application is a division of my prior application, Serial No. 358,426, filed September 26, 1940. The manufacture of mono-, di- and tri-alkyl amines by amination of alcohols and ethers is well known from the work of Sabatier, Smolenski, and others. In the practice of such processes, using alcohol as the alkylating agent, for example, the alcohol is ordinarily passed in vapor phase, together with ammonia or an amine over a dehydrating catalyst, with the result that the amine is formed in accordance with the following equations:

1. $ROH + NH_3 \rightarrow RNH_2 + H_2O$
2. $ROH + RNH_2 \rightarrow R_2NH + H_2O$
3. $ROH + R_2NH \rightarrow R_3N + H_2O$ In actual practice, the reactions of the three equations given above occur substantially simultaneously, with the result that a mixture of mono-, di- and tri-alkyl amines is formed. It is frequently desirable that the reaction be conducted in such a manner as to favor the formation of the mono-alkyl amine and depress the formation of the di- and tri-alkyl amines, and a principal feature of the present invention consists in the fact that it provides a process by which a product predominating in the mono-alkyl amine may be obtained. While undesired poly-alkyl amines may be converted into mono-alkyl amines or recycled to retard formation of further poly-alkyl amines according to the law of mass action, it is desirable that such treatment be minimized by forming an initial reaction mixture in which the mono-alkyl amine is favored if it is the product desired, and the present invention accomplishes.

A large number of catalysts have been proposed for use in the practice of processes by which ammonia is alkylated to produce alkyl amines in the general manner indicated by the above equations, by vapor phase reaction with alcohols or ethers. Regardless of the catalyst chosen, the practice of the reaction results in the formation of substantial quantities of by-products, including nitriles and olefins. A further feature of the present invention is that it provides catalysts for the practice of vapor phase reactions of this type which result in formation of smaller quantities of olefins and nitriles than are obtained by the use of prior art catalysts, and which therefore enable us to obtain an improved yield of the desired amine.

A large number of dehydrating and hydrogenating catalysts as well as catalysts having both of these functions have been disclosed in the prior art, including silica, alumina, alumina on silica, various clays, nickel on pumice, etc. These catalysts have been employed by applicant in many experiments, but none of them is closely comparable to the catalysts of the present invention in favoring formation of mono-alkyl amines.

Another difficulty encountered in the practice of processes of this character consists in the fact that only a small proportion of the materials passed over the catalyst react to form amines. An object of the present invention has accordingly been to provide catalysts which give excellent conversions of the raw materials into amines by accelerating the rate of reaction between the alkylating agent and ammonia, at the same time that they favor formation of the mono-alkyl amines.

Still further objects of the invention will be evident from a reading of the following detailed specification.

In the practice of the invention, the alkylating agent, which may be either an alcohol or an ether, is passed, together with ammonia or an amine, over a catalyst which consists of a supporting material consisting of granular alumina, this supporting material being coated or impregnated with a compound which is a catalyst in the practice of hydrogenating and dehydrogenating reactions, and which is chosen from the class consisting of the oxides of nickel, cobalt and chromium.

The supporting catalyst may consist of aluminum oxide in the form of granules, pellets or lumps and is coated with a hydrogenating and dehydrogenating catalyst which is preferably nickel oxide or chromic oxide. These catalysts have been found to be superior from the standpoint of conversion and yield, in the manufacture of mono-alkyl amines by reaction of ammonia with alcohols and ethers, to any catalyst described in the chemical literature.

In the preferred practice of the invention, the ammonia and alkylating agent are passed in vapor phase through a conduit containing the catalyst of the invention, these raw materials being heated to a temperature between 300 and 400° C. during passage through the conduit. Temperatures somewhat lower than 300° C. and somewhat higher than 400° C. may be employed, but best results are generally obtained within the range between 300 and 400° C.

In the preparation of the catalysts of the invention, the supporting catalyst may be impregnated with a salt of the metallic element of the activating catalyst or promoter. Water may then be evaporated from the resulting product, and the product resulting from this treatment may then be further treated to effect decomposition of the salt and formation of the metal oxide. Thus, in the manufacture of a catalyst consisting of alumina impregnated with chromic oxide, alumina is first impregnated with a chromium nitrate solution. The water is then evaporated from the impregnated product under vacuum, and the resulting coated aluminum particles are then put in the reaction tube in which they are later to be used in the practice of the amination reaction. They are heated in this tube to a temperature of approximately 400° C. in order to decompose the chromium nitrate, forming chromic oxide and oxides of nitrogen. These oxides of nitrogen, being volatile, are driven off, leaving the alumina coated with the chromic oxide promoting catalyst. At the conclusion of these operations, the alkylating agent, which may, for example, be methyl, ethyl, propyl, butyl, amyl, etc. alcohol or ether, is passed, together with a molecular excess of ammonia over the resulting composite catalyst, while the conduit containing the catalyst is heated to a temperature sufficient to cause heating of the gases passed through the mixture to the desired reaction temperature.

The following examples indicate the great superiority of the catalysts of the present invention over those of the prior art in favoring production of mono-alkyl amines. Comparison of these examples with examples of my concurrent application Serial No. 437,356, which is, in a sense, complementary to this application in that it favors formation of poly-alkyl amines, will illustrate the extent to which the processes of these two applications promote formation of the respective desired type of amine as contrasted with the less desired type.

*Example I*

Activated alumina (Alorco, grade A. 8-14 mesh) was heated under vacuum on a water bath for about three hours and then allowed to cool for an hour. A solution of chromium nitrate was then introduced. After addition of this solution, the vacuum was released and the mixture was allowed to stand over night. The excess water was then evaporated by heating under vacuum, on a water bath, with occasional shaking. The resulting dry material was heated to a temperature of 400° C. in order to effect decomposition of the chromium nitrate to chromium oxide as an impregnating and activating catalyst on the alumina, and removal of the oxides of nitrogen formed by decomposition of the chromium nitrate. The resulting catalyst was placed in a glass tube, and a vaporized mixture containing ammonia and butyl alcohol in the ratio of 3.98 moles of ammonia to each mole of butyl alcohol was passed over the catalyst at a space velocity of 1060 and an average temperature of 349° C., to effect alkylation of the ammonia. Upon analysis of the reaction mixture passing from the tube, it was found that 28.4% of the alcohol had reacted with the ammonia to produce mono-butyl amine and 9.91% to produce di-butyl amine, making a total of 38.31% conversion of alcohol to amine. The yield of the desired amines obtained in the practice of the process was 50.3% mono-butyl amine and 17.5% di-butyl amine based upon the alcohol, making a total yield of 67.8%.

*Example II*

A catalyst consisting of chromic oxide deposited upon activated alumina was prepared in the same manner as discussed in Example I, above. A vaporized mixture of ammonia and butyl alcohol in the ratio of 3.82 moles of ammonia to each mole of butyl alcohol was passed over the catalyst at a space velocity of 1070 and an average temperature of 347° C. to effect alkylation of the ammonia. Upon analysis of the reaction mixture passing from the tube, it was found that 31.8% of the alcohol had reached with the ammonia to produce mono-butyl amine and 11.9% to produce di-butyl amine, making a total of 43.7% conversion of alcohol to amine. The yield of the desired amine obtained in the practice of the process was 53.1% mono-butyl amine and 19.8% of di-butyl amine, making a total yield of 72.9%.

*Example III*

A catalyst consisting of nickel oxide on alumina was prepared by precipitation of nickel nitrate on alumina and treatment of the resulting product in the same manner discussed in Example I in connection with the manufacture of the chromic oxide on alumina catalyst. A vapor phase mixture of butyl alcohol and ammonia containing 3.97 moles of ammonia to each mole of butyl alcohol was passed over the catalyst at a space velocity of 1060 and an average temperature of 350° C. Upon analysis of the reaction mixture, it was found that the conversion of the alcohol to mono-butyl amine was 16.9%, and the conversion to di-butyl amine 2.33%. The yields of mono-butyl and di-butyl amines were 51.8% and 7.14%, respectively.

*Example IV*

A vapor phase mixture containing a ratio of ammonia to butyl alcohol of 3.24:1 was passed at a space velocity of 1080 and an average temperature of 324° C. over a catalyst consisting of nickel oxide precipitated on alumina. The conversion of the alcohol to mono-butyl amine was 13.2% and to di-butyl amine was 1.69%. The yields of mono- and di-butyl amine were 56.8% and 7.23%, respectviely.

Various modifications are possible within the scope of the invention, and I do not therefore wish to be limited except by the scope of the following claims.

I claim:

1. In the manufacture of amines, the process favoring production of mono-alkyl amines comprising passing a compound of the formula ROR', in which R represents an alkyl radical having from one to five carbon atoms and R' represents a member chosen from the group consisting of hydrogen and alkyl radicals having from one to five carbon atoms, together with ammonia through a conduit containing a catalyst consisting of granular alumina coated with a compound chosen from the class consisting of the oxides of chromium, nickel and cobalt, while heating the mixture to a temperature between the initial reaction temperature and the decomposition temperature of the formed amine.

2. In the manufacture of amines, the process favoring production of mono-alkyl amines comprising passing a compound of the formula ROR', in which R represents an alkyl radical having from one to five carbon atoms and R' represents a member chosen from the group consisting of hydrogen and alkyl radicals having from one to five carbon atoms, together with ammonia through a conduit containing granular alumina coated with an oxide of chromium, while heating the mixture to a temperature between the initial reaction temperature and the decomposition temperature of the formed amine.

3. In the manufacture of amines, the process favoring production of mono-alkyl amines comprising passing a compound of the formula ROR', in which R represents an alkyl radical having from one to five carbon atoms and R' represents a member chosen from the group consisting of hydrogen and alkyl radicals having from one to five carbon atoms, together with ammonia through a conduit containing granular alumina coated with an oxide of nickel, while heating the mixture to a temperature between the initial reaction temperature and the decomposition temperature of the formed amine.

4. In the manufacture of amines, the process favoring production of mono-alkyl amines comprising passing a compound of the formula ROR', in which R represents an alkyl radical having from one to five carbon atoms and R' represents a member chosen from the group consisting of hydrogen and alkyl radicals having from one to five carbon atoms, together with ammonia through a conduit containing granular alumina coated with an oxide of cobalt, while heating the mixture to a temperature between the initial reaction temperature and the decomposition temperature of the formed amine.

ROLAND H. GOSHORN.